(12) United States Patent
Van Giezen et al.

(10) Patent No.: US 6,290,082 B1
(45) Date of Patent: Sep. 18, 2001

(54) PALLET CONTAINER WITH GRID SUPPORT STRUCTURE

(75) Inventors: Maurice Gerardus Maria Van Giezen, Vogelenzang; Paul Martens, Voorhout, both of (NL)

(73) Assignee: Royal Packaging Industry Leer N.V., Amsteleveen (NL)

( * ) Notice: Subject to any disclaimer, the term of this patent is extended or adjusted under 35 U.S.C. 154(b) by 0 days.

(21) Appl. No.: 09/471,514

(22) Filed: Dec. 23, 1999

(51) Int. Cl.$^7$ .................................................. B65D 21/02
(52) U.S. Cl. ...................... 220/23.91; 220/668; 220/495; 206/386
(58) Field of Search .................................... 220/485, 494, 220/495, 495.01, 495.05, 495.06, 668, 23.91, 23.87; 206/386

(56) References Cited

U.S. PATENT DOCUMENTS

| | | | |
|---|---|---|---|
| 4,676,373 | * | 6/1987 | Schneider ............................. 206/386 |
| 4,909,387 | * | 3/1990 | Schutz ................................. 206/386 |
| 4,947,988 | * | 8/1990 | Schutz ................................. 206/386 |
| 5,678,688 | * | 10/1997 | Schutz ................................. 206/386 |

FOREIGN PATENT DOCUMENTS

| | | | |
|---|---|---|---|
| 33 44 351 C2 | | 6/1985 | (DE) . |
| 195 11 723 | | 8/1996 | (DE) . |
| 0 916 592 | | 5/1999 | (EP) . |
| 1051857 | * | 12/1966 | (GB) ................................. 220/668 |
| 2 106 948 | | 4/1983 | (GB) . |
| 2 133 430 | | 7/1984 | (GB) . |
| 2 303 653 | | 2/1997 | (GB) . |
| 319454 | * | 1/1970 | (SE) ................................... 220/668 |
| WO 91/02922 | | 3/1991 | (WO) . |

* cited by examiner

Primary Examiner—Stephen Castellano
(74) Attorney, Agent, or Firm—Knobbe, Martens, Olson & Bear, LLP

(57) ABSTRACT

A pallet container is provided comprising an inner plastic container for transporting liquids. The inner container is secured to a pallet by means of a grid support structure. The intersections of the first and second grid elements are connected by penetrating the second element through the first element. The first and second elements are then connected to one another at one or more positions in the region of the intersection.

7 Claims, 8 Drawing Sheets

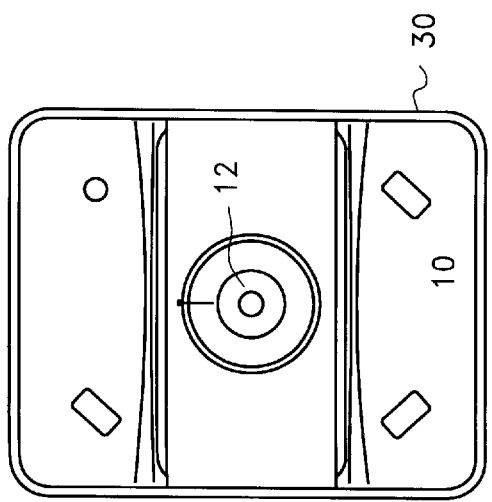
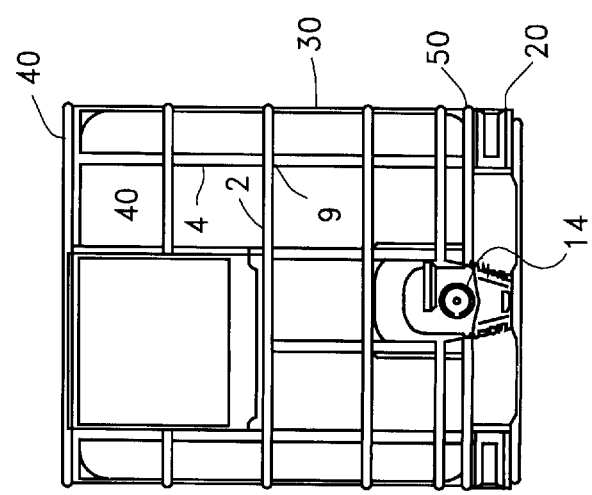
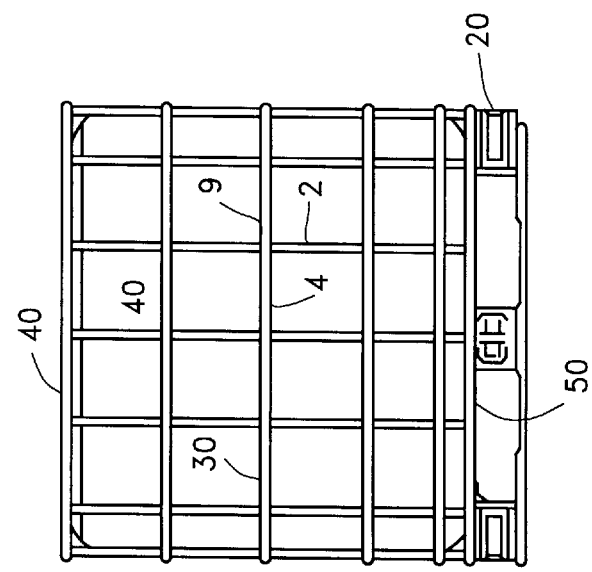

PALLET CONTAINER WITH GRID SUPPORT STRUCTURE

FIELD OF THE INVENTION

The present invention relates pallet container having an inner plastic container suitable for transporting flowable or liquid substances. In particular, the invention relates to a support structure arranged to enclose and contact the side walls of the inner container. Such pallet containers are particularly useful in the storage and transportation of fluids, for example in the chemical, petroleum or food industry.

BACKGROUND OF THE INVENTION

A conventional pallet container of the present type is disclosed in the German Patent DE-C 195 11 723. The support structure enclosing the inner container comprises a grid of vertical and horizontal metal tubes, which are deformed at their intersection so as to form four contact points at which the tubes are welded to one another.

In practice, the grid support structure of such pallet containers are subject to various mechanical loads, for example a vertical load when such containers are stacked on one another. In addition, during handling and transportation, the containers may slide and hit one another or may even be dropped causing high impact loading. Such loading of the grid construction, especially at the welded tube intersections can cause breakage of the welds. In addition, with repeated mechanical stress loading at the welds, fatigue cracks can arise in the metal tube material adjacent the tube intersection.

SUMMARY OF THE INVENTION

The object of the present invention is to provide a pallet container with an improved connection of the grid elements which allows improved mechanical strength and durability and which allows simple and inexpensive construction of the container.

According to the present invention, the inner plastic container for transporting liquids is supported by a grid structure arranged to enclose and contact the side walls of the inner container. The grid of the support structure comprises first and second elongate elements crossing one another at intersections. Each first elongate element is provided with a receiving opening through which the respective second elongate element passes and penetrates through the first element. The first and second elements are connected to one another at one or more positions in the region of intersection.

Preferably, the inner dimension of the receiving opening of the first opening is dimensioned with respect to an outer dimension of the second element so as to provide a frictional fit of the two elements. In this case, the mechanical strength of the interconnection against bending moments in the plane of the grid is increased.

The outer surface of the second smaller dimensioned elements define two planes of the grid which are parallel to one another. In a preferred embodiment, the first and second elongated elements are connected to one another at these two tangential planes. Normally, the positions will be where the outer surface of the second element lies opposed to the inner surface of the larger dimensioned first element.

In another embodiment, the first elongate element is formed to have a tubular profile and is provided with one or more ridges formed along its interior. These inner ridges are arranged to contact the outer surface of the second element when penetrated through the receiving opening. The contact of one or more such ridges with the outer surface of the second element provides the positions at which the elements can be connected. The use of inner ridges of this embodiment adds mechanical strength by reinforcement to the first elongate element and improves the reliability and durability of the connection at the intersection.

The first and second elements used in constructing the grid support structure of the present pallet container can be of various types. The two elongate elements may be solid or hollow or may have an open profile such as a U-shaped or C-shaped profile with an open longitudinal portion. Preferably, both of the elements are metal tubes having a cross-section which may be circular, oval, square, triangular or rectangular. Alternatively, the second elongate element can be provided in the form of a plate which passes through a corresponding slot or hole in the first element. When the two elements are made of metal tubing, the connection at their contact positions is preferably formed by resistance welding. Alternatively, the two elements could be appropriately deformed within their region of intersection so as to produce a form fit connection therebetween. It is also contemplated that the two elements can be made of a high strength plastic material, in which case, the connection can be accomplished by melt fusion bonding or melt adhesive bonding.

The support grid structure of the present pallet container will normally having the first and second elongate elements disposed vertically and horizontally with respect to one another. Preferably, the first elements having the receiving hole will be the vertical elements, while the horizontal elements will penetrate therethrough. Conversely, it is also possible to have the first elongate elements disposed horizontally, while the second elements would be disposed vertically and penetrate through the horizontal elements.

The grid support structure also comprises upper and lower rim elements, which extend about the circumference of the support structure. The upper and lower ends of the vertical elongate elements preferably form a T-intersection with the upper and lower rim elements. The T-intersection is constructed by passing the vertical element into an opening in the rim element, although it does not penetrate through the rim element as do the above grid intersections. The T-intersection can be formed by the same means described above for the grid intersections, with the exception that the vertical elements only pass into a portion of the interior of the rim elements.

BRIEF DESCRIPTION OF THE DRAWINGS

Further objects and advantages of the invention will become apparent in the following description of embodiments in conjunction with the drawings.

FIGS. 1a–c show a top view and elevations of a pallet container with a grid support structure according to a first embodiment of the present invention.

DETAILED DESCRIPTION OF THE INVENTION

Figure 2:
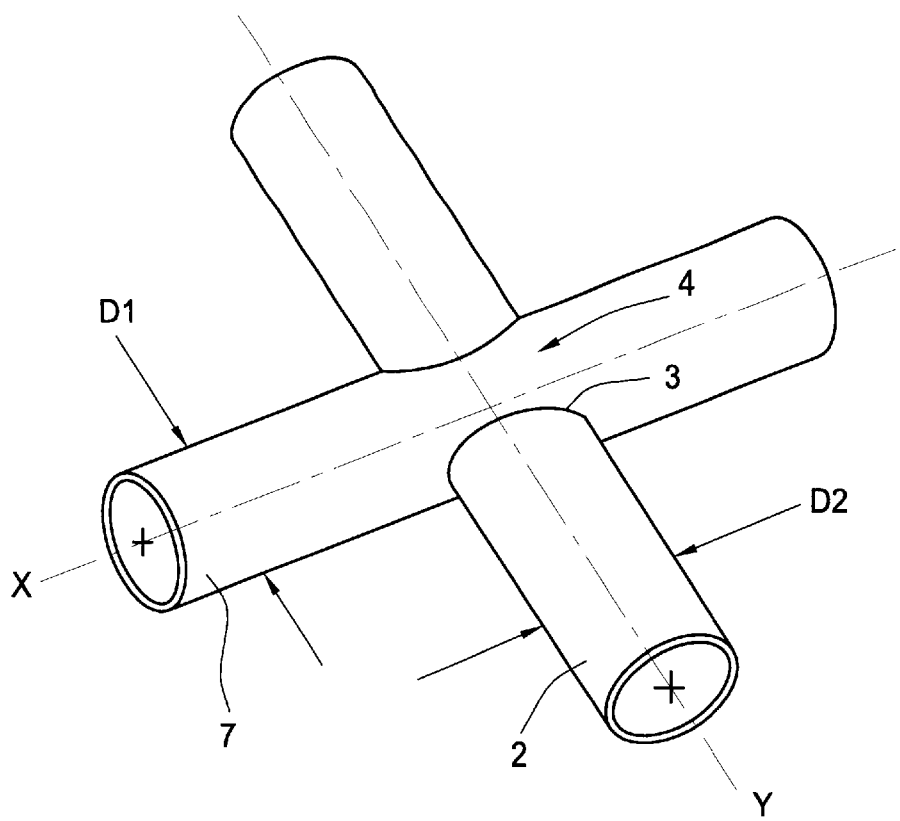
FIG. 2 shows an embodiment of the crossing intersection of two tubular elements.

Referring to FIGS. 1a, 1b and 1c, a pallet container according an embodiment of the present invention comprises an inner plastic container 10 for transporting liquids. The container is quadrangular in form and provided with an upper opening 12 and a discharge opening 14 located near the bottom wall of the container 10. The bottom wall of the container is supported by the pallet 20 or a pallet-like structure located beneath the container 10 for supporting the weight of the inner container. The container 10 and the pallet 20 have dimensions conforming with the relevant European Standards. Such pallets for the container may be made of wood, steel or plastic. Normally, the pallet will be constructed so as to nest with another container when stacked thereon.

The outer support structure 30 is arranged to enclose and support the side walls of the inner container. As can be seen in FIGS. 1b and 1c, the support structure encompasses the entire inner container at its side walls and is formed of a grid of first and second elongate elements 1, 2. The elements are connected to one another at intersections 9. The upper and lower ends of the vertical elements 2 are connected to rim elements 40, 50 which also circumvent the container. In the embodiment of FIG. 1b, the lower rim element 50 is interrupted at the point of the discharge opening 14.

Figure 3:
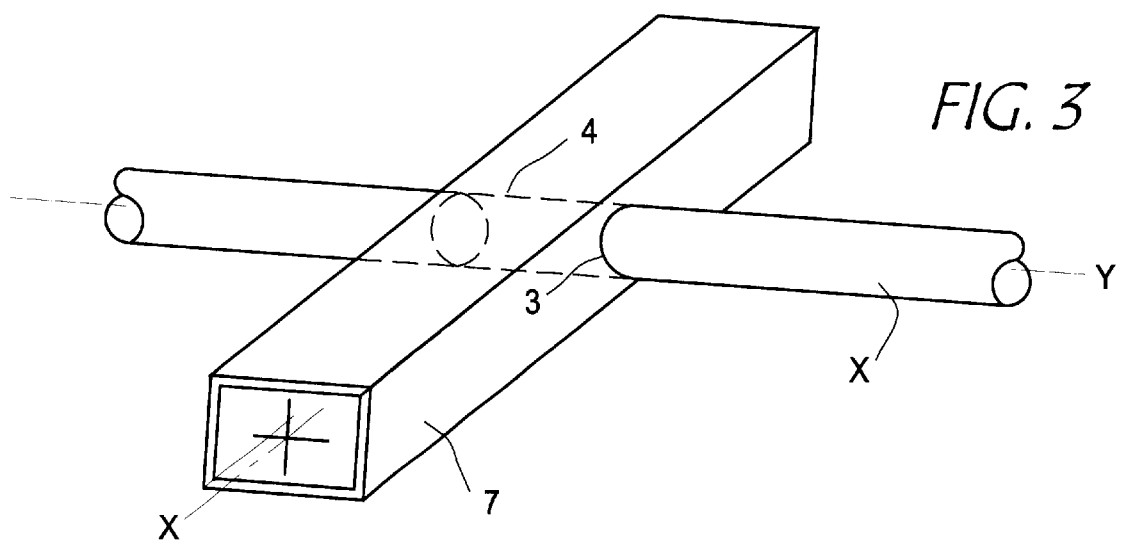
FIG. 3 shows a crossing intersection in which the first tubular element is rectangular in cross-section.

Embodiments of the intersections 9 are shown in FIGS. 2 and 3. An opening 3 is formed in the first element 1 so as to allow the second element 2 to penetrate therethrough. In these embodiments. The first element is a tubular member which may be circular in cross-section (FIG. 2) or rectangular (FIG. 3). The second element is also tubular and has a diameter d2 which is naturally smaller than the diameter d1 of the first tube. Preferably, the outer diameter d2 of the second element is 20% to 30% smaller than the outer diameter d1 of the first element. As an example, the diameter of the first tube 1 can be about 22 mm with the diameter of the second tube 2 being 16 mm. Although both the first and second elements could be solid bars, it is preferred that both of the elements be tubular in construction. It is also possible that the first element be an open profile, which will be discussed below.

The cross-sectional profile of the tubes need not be circular and square as shown in FIGS. 2 and 3, but could also be generally oval, square, triangular or even combinations of the above forms. According to the present invention, the first and second elements 1, 2 are connected to one another at one or more positions in the region of their intersection. In the embodiments of FIGS. 2 and 3, two connecting positions 4 are located at the outer surface of the second element 2 which lies opposed to the inner surface of the first element 1 (only the top position 4 is shown). For example, when the elements 1, 2 are metal tubes, the second tube, when properly positioned within the first tube is welded at the positions 4 under sufficient pressure to urge the two sides of the first tube 1 into contact with the outer wall of the second tube 2 under formation of the weld. In these two embodiments, the second tube 2 requires no further processing once purchased from the manufacturer. The first tube need only be provided with the receiving hole 3 at the proper orientation and spacing to the form the grid support structure.

The inner dimension of the receiving opening 3 formed in the first element 1 is preferably sized with respect to the outer dimension d2 of the second element 2 such that there is no play between the receiving opening 3 and the second element 2. In this preferred embodiment, the second element 2 is then inserted through the opening 3 under the application of force to overcome friction between the outer surface of the second element 2 and the inner defining surfaces of the receiving opening 3. In this manner a non-positive frictional fit is established between the first and second elements 1, 2. This construction adds to the mechanical strength of the connection assembly, particularly against bending moments which may arise under load in the plane of the two elements. The above described procedure is preferred, however, a frictional fit or form fit of various types may also be used.

Figure 4:
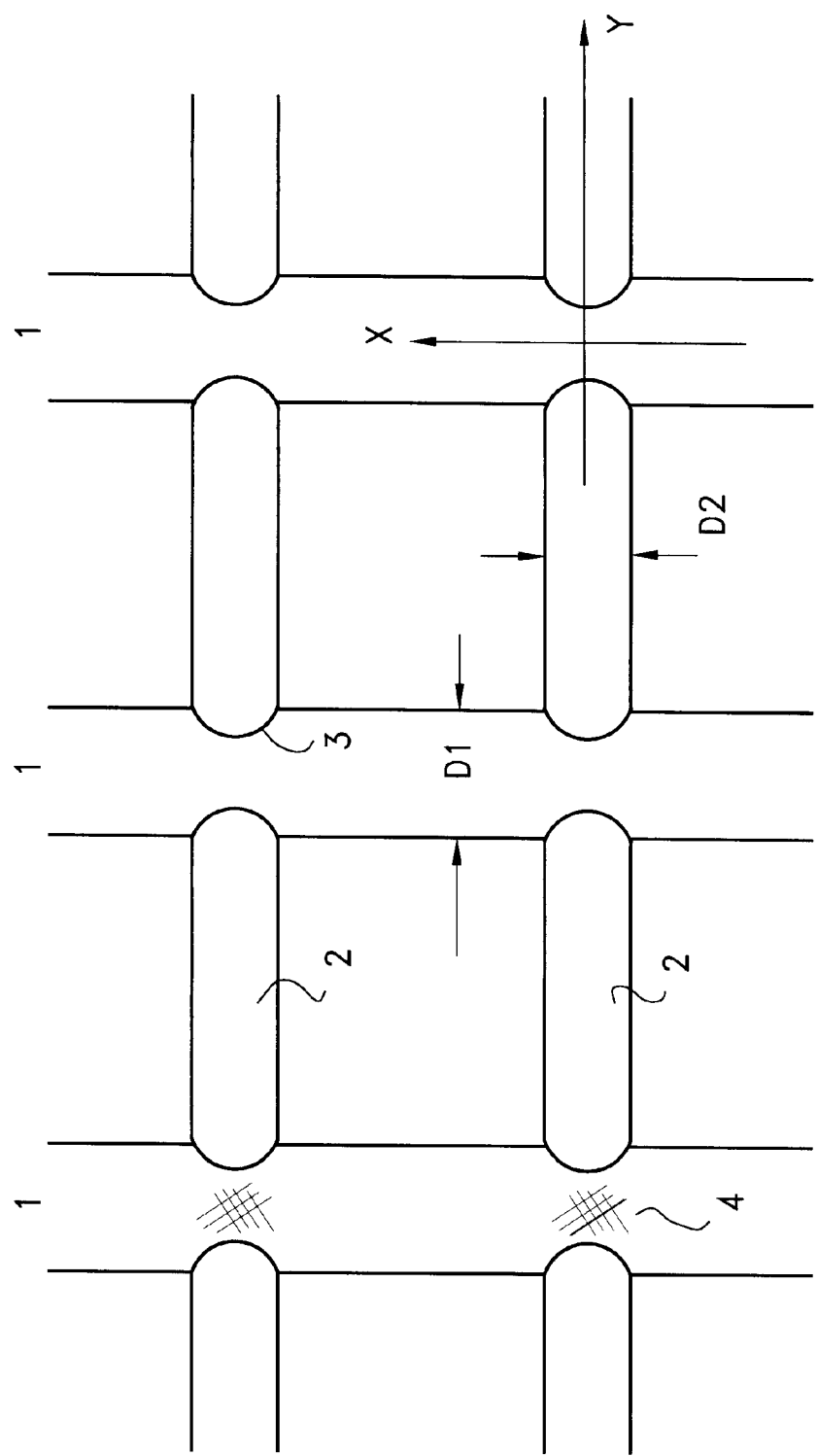
FIG. 4 shows an embodiment of the grid structure with the crossing in its intersections shown in FIG. 2.

FIG. 4 shows an arrangement of the grid structure in which the first elements 1 are arranged vertically and the second elements 2 are arranged horizontally and penetrate the first vertical elements 1. Although this orientation is preferred, it is also possible to provide the first element 1 in the horizontal position with the second vertical elements penetrating therethrough in horizontal direction as shown in FIGS. 1b and 1c.

Figure 5A:
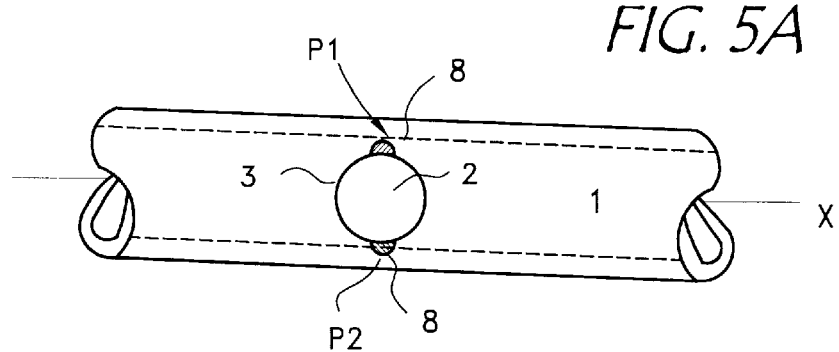
FIG. 5a shows an intersection in which ridges are formed on the exterior of the second element which penetrate through the first element.

In the intersection shown in FIG. 5a, the second element 2 is provided with ridges 8 which project from its outer surface. The receiving openings 3 of the first element 1 is adapted to allow passage of the second element 2 with the ridges 8. The passage may be with play or only slight friction. Once inserted to penetrate through the first element 1, the two elements 1, 2 are connected to one another at the positions $P_1$ and $P_2$.

Figure 5B:
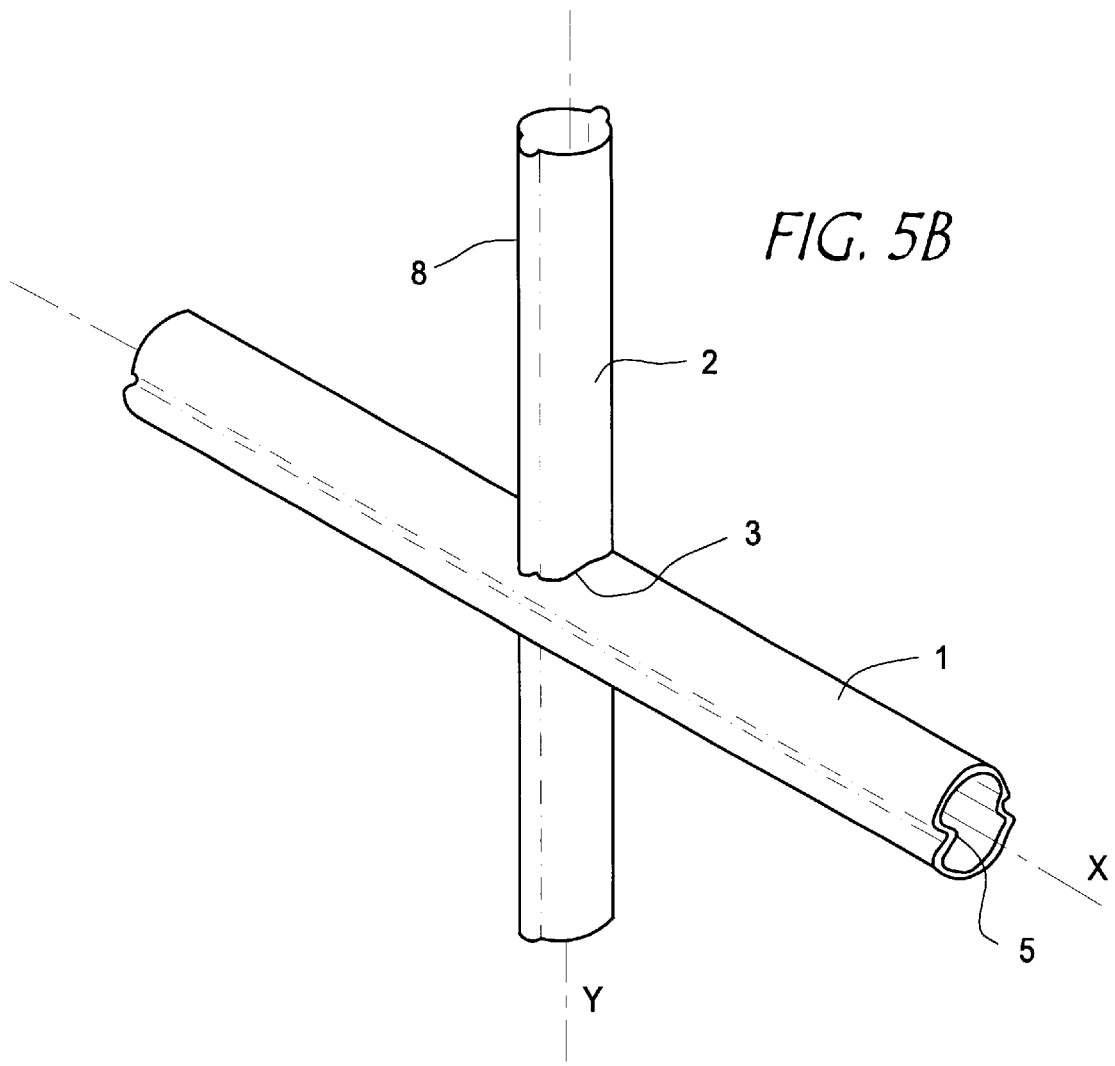
FIG. 5b shows an intersection in which exterior ridges formed on the second element penetrate through the first element and engage with interior ridges of the first element.

As shown in FIG. 5b, the exterior ridges 8 of the second element 2 penetrate the opening 3 as in FIG. 5a. In this case, the interior of the first element 1 is provided with two inner ridges 5 which oppose one another about the centre axis x. In this embodiment, the crest of the exterior ridges 8 at the intersection are dimensioned to engage with the crest of the inner ridges 5 to form the connection positions.

Figure 6:
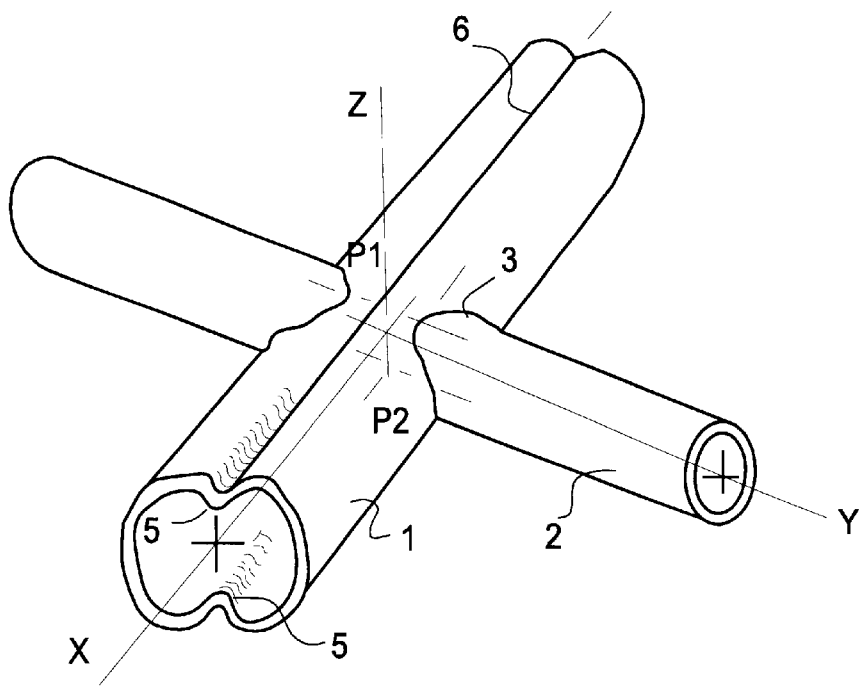
FIG. 6 shows an intersection in which ridges are formed on the interior of the first element.
Figure 7:
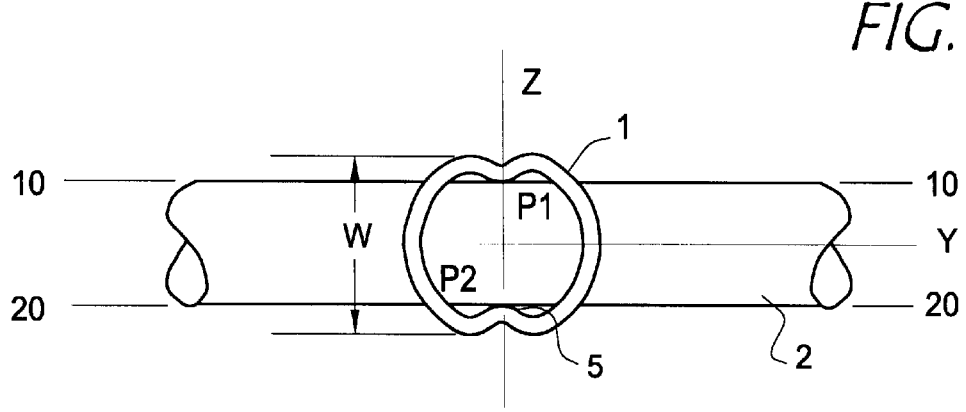
FIG. 7 shows a cross-section of the embodiment of FIG. 6 taken along the x–z plane.

The intersection shown in FIGS. 6 and 7 include a first tubular element 1 having two ridges 5 arranged in its interior. The dimensions of the ridges as well as the diameter of the second element 2 are such that two contact positions $P_1$ and $P_2$ arise. The tubular element 1 of larger diameter is preprocessed to form the two ridges 5, for example by externally applying pressure to a circular tube to form a longitudinal crease or indentation 6 as shown in FIG. 6. Alternatively, the indentation could be formed only in the regions of intersection of the two elements. In addition, one or more internal ridges can be formed in the interior of the tube during the production process of the tube, whereby the outer diameter of the tube would remain circular.

As shown in FIG. 7, the second tubular elements 2 define tangential planes 10, 20, which also define the tangential inner and outer planes of the grid support structure. As c an be seen from the figure, the contact positions $P_1$, $P_2$ of the ridges with the second element 2 lie at the two tangential planes 10, 20. As mentioned above, when both of the elements 1, 2 are metal tubes, the connection at these positions will be performed by resistance pressure welding. The maximum width of the intersection corresponds to the distance W and represents the effective dimension of the first tube 1 in the z direction. The overall width W is only slightly larger than the distance between the tangential planes 10, 20 of the smaller diameter tube 2. This is particularly advantageous for the pallet container in terms of space savings. Moreover, all surfaces at the intersection are smooth or rounded without any projecting edges. This avoids "catching" of two pallet containers during handling, for example when the containers are placed adjacent to one another.

Figure 8:
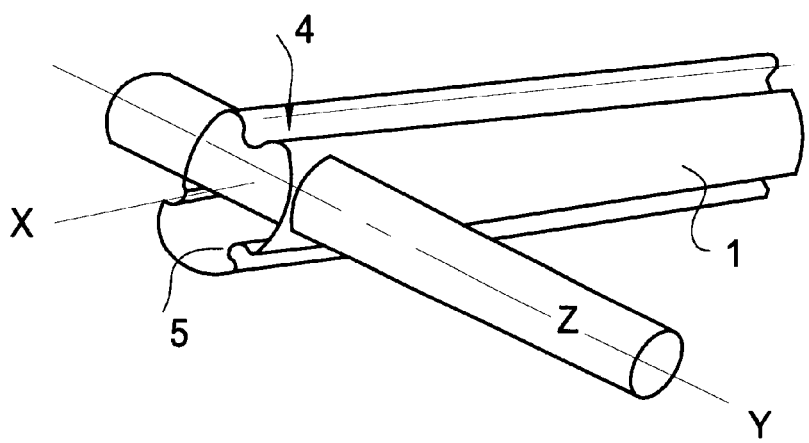
FIG. 8 shows an intersection with three ridges formed within the first element.
Figure 9:
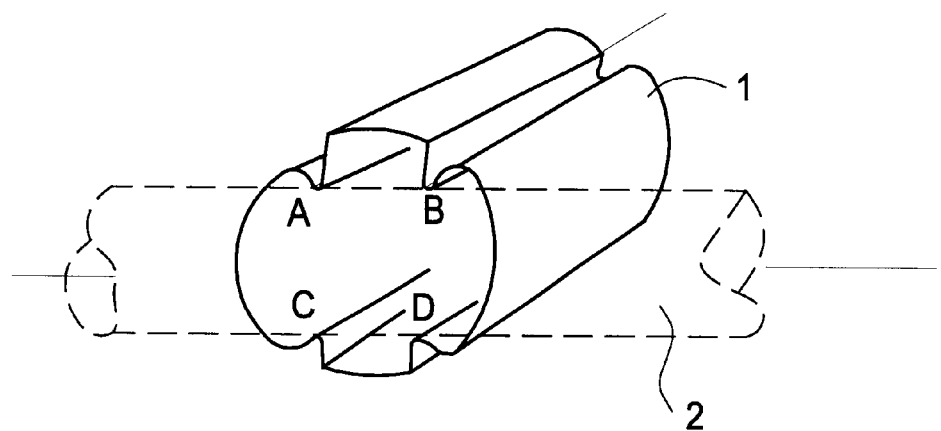
FIG. 9 shows an intersection in which the second elements penetrates and contacts four ridges on the interior of the first element.

The intersection for the grid support structure of the present invention can also be constructed as shown in FIGS. 8 or 9. In FIG. 8, the first tubular element 1 is provided with three ridges 5 formed in its interior. The second element 2 penetrates the receiving opening 3 so as to contact only one of the three inner ridges 5. In this embodiment, the two elements 1, 2 are connected to one another at only one position, indicated with the reference numeral 4. As can also be seen from FIG. 8, the centre axis y of the smaller diameter element 2 does not intersect the centre axis x of the first tubular element 1. As will be appreciated from the figure, the number of ridges contacted by the second tubular element 2 will depend on its diameter and the orientation of the receiving hole for penetration. In FIG. 9, four ridges are symmetrically displaced in angular position about the interior of the first tubular element 2. The receiving opening 3 as well as the diameter of the second tubular element 2 is such that four contact positions a, b, c, d arise for tube connection.

Figure 10:
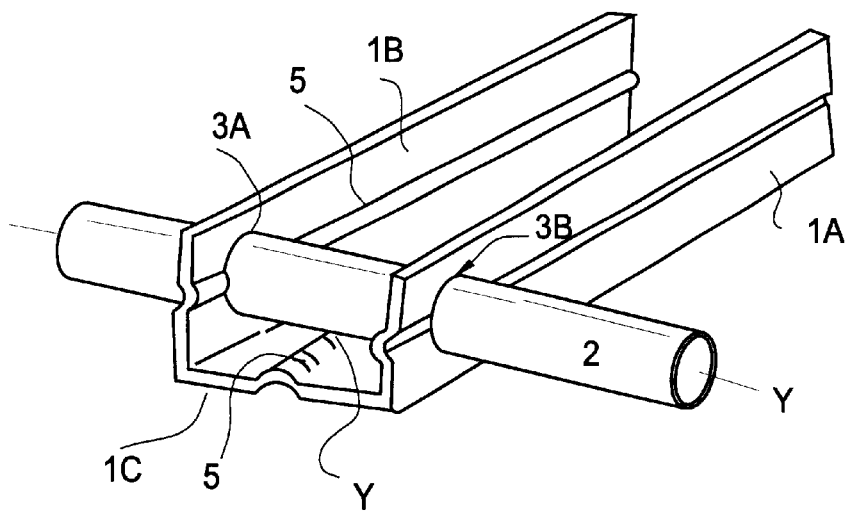
FIG. 10 shows an intersection in which the first element comprises a U-shaped profile having one inner ridge which contacts the second element.

Another arrangement of the intersection is shown in FIG. 10, where the first elongate element is formed as a U-shaped profile with a base 1c and two side portions 1a, 1b. Other shapes of the open profile are possible, although it is preferred that the profile have two opposing side portions 1a, 1b through which the receiving hole 3 can be formed. In this embodiment, the side walls 1a, 1b are substantially parallel to one another and essentially flat surfaces. This allows a somewhat easier formation of the receiving holes 3a, 3b for example by means of stamping. The profile comprises at least one ridge 5 in the base 1c. The inner ridges 5 in the side portions are shown in FIG. 10 which would include mechanical strength of the profile 1, however which are not necessary for the connection at the intersection. The second element 2 penetrates through the two holes 3a, 3b and contacts the ridge 5 of the base 1c, whereby the two elements are connected to one another.

Figure 11:
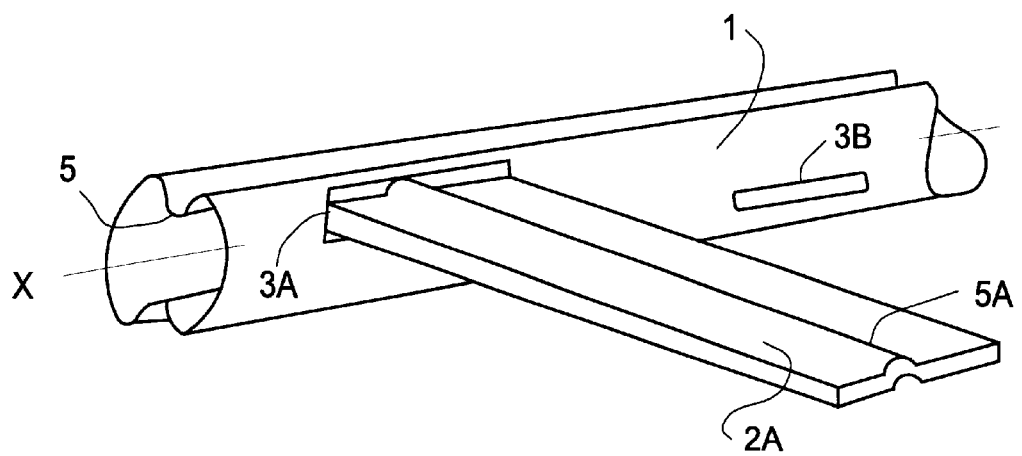
FIG. 11 shows an intersection in which the second element comprises a plate having a ridge which penetrates the first element.

The second elongate element 2 in the above embodiments are solid rods or tubular structures. FIG. 11 shows an embodiment in which the second element 2a is formed as a plate which passes through a correspondingly dimensioned slot 3a in the first tubular element 1. Two inner ridges 5 are formed within the tube 1, while an outer ridge 5a is formed on the surface of the plate 3a. When penetrated through the tube 1, the ridge 5a of the plate 2a contacts the upper inner ridge 5, whereby an intersection is formed with one connection position. In this embodiment, the slot or hole 3a is located in a relatively offset position from the central axis x of the tube 1. As can be seen in FIG. 11, the next adjacent plate member could be penetrated through a slot 3b offset from the centre axis x in the opposite direction. In this case the ridge of the plate would be directed downwardly and would contact the lower ridge 5 of the tube 1 as shown in the figure.

Figure 12A:
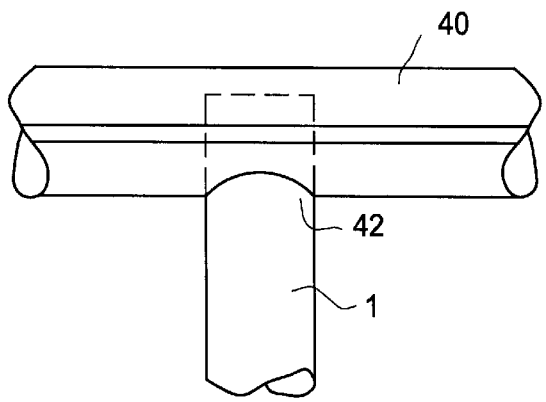
FIG. 12 shows a T-intersection of a vertical element with a rim element having two internal ridges.
Figure 12B:
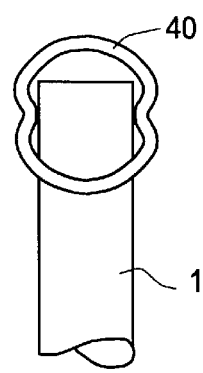
Figure 13A:
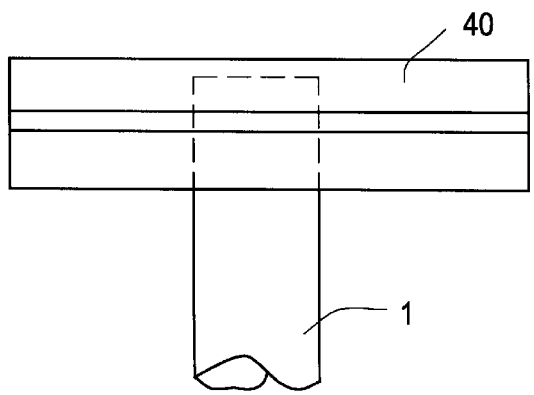
FIG. 13 shows a T-intersection in which the rim element comprises a U-shaped profile having two inner ridges.
Figure 13B:
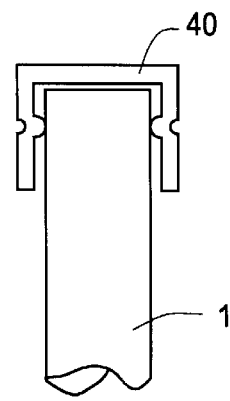

Returning to FIGS. 1a, 1b and 1c, the grid support structure 30 comprises an upper rim 40 and a lower rim 50 to which the vertical elements of the grid are connected in a T-intersection. As mentioned above, the vertical elements can be the first element 1 having the hole 3 for penetration or can also be the second element 2. FIGS. 12 and 13 show arrangements for connecting the vertical elements to the upper rim element 40. The same type of T-intersection can of course be used for the lower rim element 50.

The basic principles for forming the T-intersection are the same as those described above for the crossing intersection of the first and second elements. The rim element 40 will be of larger dimension and correspond to the first elongate element described above. The vertical element, indicated by way of example in FIG. 1 with the reference numeral 1, will correspond to the second element described above in the crossing intersections. The main difference is that for the present T-intersections, the receiving hole 42 as shown in FIG. 12 is formed such that the vertical element 1 does not penetrate through the rim element 40. In the T-intersection of FIG. 13, the opening is already provided by the open side of the U-shaped profile 40 as the rim element. Otherwise, the provisions for connecting the two elements as well as the possible forms and shapes of the respective elements are the same as in the crossing intersection described above in conjunction with the FIGS. 2 to 11.

FIGS. 12 and 13 show particularly suitable T-connections in which the rim element 40 comprises two inner ridges which contact the vertical element 1 once inserted into the rim element 40.

Although it is preferred that the various elements 1, 2, 40, 50 be made of metal tubes and be welded at their connection positions, it is also contemplated that the connections be made by means of a form fit produced by deformation of the respective elements. For example, in FIGS. 2 and 3, a recess or indentation could be formed with a press into the outer tube 1 at the intersection location 4. The recess would be deep enough to form a matching recess in the outer surface of the inner second element, whereby a form fit interconnection results.

Alternatively, the second tube 2 could be deformed either on the interior of the receiving hole 3 or outside of it. For example in the embodiments of FIGS. 6 to 10, the second tube 2 could be provided with indentations which match the position of the inner ridges of the first tube 1. Engagement of the ridges in the indentations would produce a fit which would prevent axial movement of the second tube with respect to the first tube.

What is claimed is:
1. A pallet container comprising:
an inner plastic container for transporting liquids, the bottom wall of the inner container supported by a pallet-like structure;
a support structure arranged to enclose and contact the side walls of the inner container and formed as a grid of first and second elongate elements connected to one another at their intersections, wherein each first elongate element has a receiving opening through which the respective second elongate element is passed, the first and second elongate elements being connected to one another at one or more positions in the region of their intersection, wherein the connection positions are formed at two tangential planes of a grid defined by outer surfaces of the second elements, and wherein the outer surface of the second element is provided with two ridges which contact an inner surface of the first element to form the connection positions.

2. A pallet container comprising:

an inner plastic container for transporting liquids, the bottom wall of the inner container supported by a pallet-like structure;

a support structure arranged to enclose and contact the side walls of the inner container and formed as a grid of first and second elongate elements connected to one another at their intersections, wherein each first elongate element has a receiving opening through which the respective second elongate element is passed, the first and second elongate elements being connected to one another at one or more positions in the region of their intersection, wherein the first elongate element is tubular and comprises one or more inner ridges, the ridges arranged to contact an outer surface of the second element to form said one or more positions at which the elements are connected, and wherein the first element comprises three inner ridges, the receiving opening being provided such that the outer surface of the second element contacts one of the inner ridges at which position the elements are connected.

3. A pallet container comprising:

an inner plastic container for transporting liquids, the bottom wall of the inner container supported by a pallet-like structure;

a support structure arranged to enclose and contact the side walls of the inner container and formed as a grid of first and second elongate elements connected to one another at their intersections, wherein each first elongate element has a receiving opening through which the respective second elongate element is passed, the first and second elongate elements being connected to one another at one or more positions in the region of their intersection, wherein the first elongate element is tubular and comprises one or more inner ridges, the ridges arranged to contact the outer surface of the second element to form said one or more positions at which the elements are connected, and wherein the first element comprises four inner ridges, the four ridges arranged to contact the outer surface of the second element at four positions at which the elements are connected.

4. A pallet container comprising:

an inner plastic container for transporting liquids, the bottom wall of the inner container supported by a pallet-like structure;

a support structure arranged to enclose and contact the side walls of the inner container and formed as a grid of first and second elongate elements connected to one another at their intersections, wherein each first elongate element has a receiving opening through which the respective second elongate element is passed, the first and second elongate elements being connected to one another at one or more positions in the region of their intersection, wherein the first elongate element is formed as an open profile, the profile having one or more inner ridges arranged to contact an outer surface of the second element to form said one or more positions at which the elements are connected, and wherein the second elongate element is tubular having a cross-sectional shape selected from the group consisting of circular, oval, square, triangular and rectangular.

5. A pallet container comprising:

an inner plastic container for transporting liquids, the bottom wall of the inner container supported by a pallet-like structure;

a support structure arranged to enclose and contact the side walls of the inner container and formed as a grid of first and second elongate elements connected to one another at their intersections, wherein each first elongate element has a receiving opening through which the respective second elongate element is passed, the first and second elongate elements being connected to one another at one or more positions in the region of their intersection, wherein the second elongate element is a plate which passes through a slot as the receiving opening in said first elongate element.

6. The container of claim 5, wherein the first elongate element comprises a tube having at least one inner ridge, said plate having another ridge adapted to contact the inner ridge of the tube when inserted into the receiving opening to provide for the position for connection of the two elements.

7. A pallet container comprising:

an inner plastic container for transporting liquids, the bottom wall of the inner container supported by a pallet-like structure;

a support structure arranged to enclose and contact the side walls of the inner container and formed as a grid of first and second elongate elements connected to one another at their intersections, wherein each first elongate element has a receiving opening through which the respective second elongate element is passed, the first and second elongate elements being connected to one another at one or more positions in the region of their intersection, wherein the first and second elongate elements are made of a plastic material and the elements are connected at said one or more positions by an adhesive or by melt-fusion bonding.

* * * * *